United States Patent
Li et al.

(10) Patent No.: US 12,299,953 B2
(45) Date of Patent: May 13, 2025

(54) VISUAL POSITIONING METHOD AND APPARATUS, DEVICE, AND MEDIUM

(71) Applicant: Suzhou MetaBrain Intelligent Technology Co., Ltd., Suzhou (CN)

(72) Inventors: Xiaochuan Li, Suzhou (CN); Rengang Li, Suzhou (CN); Yaqian Zhao, Suzhou (CN); Zhenhua Guo, Suzhou (CN); Baoyu Fan, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/716,409

(22) PCT Filed: Sep. 28, 2022

(86) PCT No.: PCT/CN2022/122335
§ 371 (c)(1),
(2) Date: Jun. 4, 2024

(87) PCT Pub. No.: WO2023/201990
PCT Pub. Date: Oct. 26, 2023

(65) Prior Publication Data
US 2024/0428555 A1    Dec. 26, 2024

(30) Foreign Application Priority Data
Apr. 19, 2022   (CN) .......................... 202210407177.8

(51) Int. Cl.
*G06V 10/72* (2022.01)
*G06V 10/80* (2022.01)
*G06V 10/82* (2022.01)

(52) U.S. Cl.
CPC ............ *G06V 10/72* (2022.01); *G06V 10/806* (2022.01); *G06V 10/82* (2022.01)

(58) Field of Classification Search
CPC ....... G06V 10/72; G06V 10/806; G06V 10/82
See application file for complete search history.

(56) References Cited

U.S. PATENT DOCUMENTS

| 11,238,631 | B2 * | 2/2022 | Sikka | ..................... G06V 10/25 |
| 2020/0097604 | A1 * | 3/2020 | Lee | ......................... G06N 3/08 |

(Continued)

FOREIGN PATENT DOCUMENTS

| CN | 112800782 A | 5/2021 |
| CN | 113095435 A | 7/2021 |

(Continued)

OTHER PUBLICATIONS

International Search Report and Written Opinion of International Searching Authority of corresponding PCT application (PCT/CN2022/122335) Jan. 5, 2023 including English translation (17 pages).

(Continued)

*Primary Examiner* — David F Dunphy
(74) *Attorney, Agent, or Firm* — Crowell & Moring LLP

(57) ABSTRACT

The present application relates to the technical field of artificial intelligence, and discloses a visual positioning method and apparatus, a device, and a medium. The method includes: performing feature splicing on an image encoding feature and a text encoding feature; performing feature fusion on spliced encoding features to obtain a first fused encoding feature; performing noise correction on the first fused encoding feature and the text encoding feature on the basis of a preset cross-attention mechanism to obtain a corrected fused feature and a corrected text encoding feature, and performing feature fusion on the spliced encoding feature and the corrected text encoding feature to obtain a second fused encoding feature; and correcting a preset frame feature using a target encoding feature on the basis of the corrected fused feature and the second fused encoding (Continued)

feature to predict a regional position coordinate of a target visual object.

20 Claims, 12 Drawing Sheets

(56) References Cited

U.S. PATENT DOCUMENTS

| | | | |
|---|---|---|---|
| 2023/0154159 A1* | 5/2023 | Kim | G06V 10/82 382/159 |
| 2023/0162490 A1* | 5/2023 | Zhang | G06V 10/82 382/159 |

FOREIGN PATENT DOCUMENTS

| | | |
|---|---|---|
| CN | 113837102 A | 12/2021 |
| CN | 113850201 A | 12/2021 |
| CN | 114092758 A | 2/2022 |
| CN | 114511472 A | 5/2022 |
| KR | 10-2279797 B1 | 7/2021 |

OTHER PUBLICATIONS

Search report of corresponding CN priority application (CN202210407177.8) May 20, 2022 (1 page).
First Office Action of corresponding CN priority application (CN202210407177.8) May 27, 2022 including English translation (7 pages).
Notification to Grant Patent Right for Invention of corresponding CN priority application (CN202210407177.8) Jun. 10, 2022 including English translation (3 pages).

* cited by examiner

A girl is wearing a white dress

A girl is wearing a red dress

VISUAL POSITIONING METHOD AND APPARATUS, DEVICE, AND MEDIUM

CROSS-REFERENCE TO RELATED APPLICATION

This application is the national phase application of International Patent Application No. PCT/CN2022/122335, filed Sep. 28, 2022, which claims priority to Chinese Patent Application No. 202210407177.8, entitled "VISUAL POSITIONING METHOD AND APPARATUS, DEVICE, AND MEDIUM", filed to China National Intellectual Property Administration on Apr. 19, 2022. The contents of International Patent Application No. PCT/CN2022/122335 and Chinese Patent Application No. 202210407177.8 are incorporated herein by reference in their entireties.

FIELD

The present application relates to the technical field of artificial intelligence, and particularly to a visual positioning method and apparatus, a device, and a medium.

BACKGROUND

In recent years, the multi modal (MM) has become a very important research direction in the field of artificial intelligence (AI). Due to its emphasis on the fusion of visual, text, speech, and other information, MM-related algorithms emerge endlessly: various methods based on convolutional neural networks (CNNs) and attention mechanisms (attention) have a wide range of applicability and have become mainstream methods in fields such as visual commonsense reasoning (VCR), visual question answering (VQA), and visual positioning.

A visual positioning task is one of the important research directions in the field of MM AI, which aims to locate a relevant object in a picture according to the description and give a coordinate position of the object. However, there are still some problems in the implementation of existing visual positioning tasks, which are easily overlooked in "laboratory" research, such as errors in "text", also known as noise. The text error is a text distortion due to "people". Generally, human slips of the tongue, subjective biases in describing objects, ambiguities in describing sentences, and other reasons will lead to text errors, which are very common in daily life, but are easily ignored in a design process of an AI algorithm, becoming an obstacle between existing methods and implementation. In short, when there are some errors in the input text, it is difficult for the existing methods to find and locate the object that the sentence itself wants to describe.

Therefore, it is a problem to be solved urgently in the art to avoid the impact of noise generated due to human language text errors on visual positioning and to realize anti-noise visual positioning.

SUMMARY

The present application provides a visual positioning method, including:
encoding a target image and a target text, and performing feature splicing on an image encoding feature and a text encoding feature obtained after the encoding to obtain spliced encoding features;
performing image-text feature fusion on the spliced encoding features using a preset image-text feature fusion unit constructed on the basis of a preset self-attention mechanism to obtain a first fused encoding feature;
performing image-text noise correction on the first fused encoding feature and the text encoding feature using a preset noise correction unit to obtain a corrected fused feature and a corrected text encoding feature, the preset noise correction unit being a unit constructed on the basis of the preset self-attention mechanism and a preset cross-attention mechanism;
inputting the spliced encoding feature and the corrected text encoding feature into the preset image-text feature fusion unit to obtain a second fused encoding feature; and
correcting a preset frame feature through a preset target frame correction unit using a target encoding feature determined on the basis of the corrected fused feature and the second fused encoding feature, and predicting a regional position coordinate of a target visual object on the target image using a corrected frame feature, the preset target frame correction unit being a unit constructed on the basis of the preset self-attention mechanism and the preset cross-attention mechanism.

In one or more embodiments, before the performing image-text feature fusion on the spliced encoding features using a preset image-text feature fusion unit constructed on the basis of a preset self-attention mechanism, the method further includes:
constructing an image-text feature fusion sub-unit using a self-attention operation unit, a layer normalization unit, a feature deletion unit, and a feature addition unit which are constructed on the basis of the preset self-attention mechanism; and
concatenating a first preset number of the image-text feature fusion sub-units successively to construct and obtain the preset image-text feature fusion unit;
accordingly, the performing image-text feature fusion on the spliced encoding features using a preset image-text feature fusion unit constructed on the basis of a preset self-attention mechanism to obtain a first fused encoding feature includes:
taking the first image-text feature fusion sub-unit in the preset image-text feature fusion unit as a current image-text feature fusion sub-unit, and taking the spliced encoding feature as a feature to be processed;
inputting the feature to be processed into the current image-text feature fusion sub-unit;
performing a self-attention operation, a layer normalization operation, a feature deletion operation, and a feature addition operation successively on the feature to be processed using the current image-text feature fusion sub-unit to obtain a corresponding current operation processing result; and
obtaining the first fused encoding feature according to the current operation processing result.

In one or more embodiments, the obtaining the first fused encoding feature according to the current operation processing result includes:
determining whether the current image-text feature fusion sub-unit is the last one;
in response to the current image-text feature fusion sub-unit not being the last one, updating the current image-text feature fusion sub-unit to a next image-text feature fusion sub-unit, updating the feature to be processed to the current operation processing result, and returning to perform the step of inputting the feature to be processed into the current image-text feature fusion sub-unit; and in response to the current image-text feature fusion sub-unit being the last one, taking the current operation processing result as the first fused encoding feature.

In one or more embodiments, the performing a self-attention operation, a layer normalization operation, a feature deletion operation, and a feature addition operation successively on the feature to be processed using the current image-text feature fusion sub-unit to obtain a corresponding current operation processing result includes:
- performing the self-attention operation on the feature to be processed using the self-attention operation unit in the current image-text feature fusion sub-unit to obtain a first operation feature;
- performing layer normalization on the first operation feature using the layer normalization unit in the current image-text feature fusion sub-unit to obtain a second operation feature;
- performing the feature deletion operation on the second operation feature using the feature deletion unit in the current image-text feature fusion sub-unit according to a preset proportion to obtain a third operation feature; and
- performing the feature addition operation on the third operation feature and the feature to be processed using the feature addition unit in the current image-text feature fusion sub-unit to obtain the operation processing result in the current image-text feature fusion sub-unit.

In one or more embodiments, before the performing image-text noise correction on the first fused encoding feature and the text encoding feature using a preset noise correction unit, the method further includes:
- constructing a first noise correction sub-unit using a self-attention operation unit, a feature deletion unit, a layer normalization unit, and a feature addition unit which are constructed on the basis of the preset self-attention mechanism;
- constructing a second noise correction sub-unit using a cross-attention operation unit, a feature deletion unit, a layer normalization unit, and a feature addition unit which are constructed on the basis of the preset cross-attention mechanism; and
- concatenating the first noise correction sub-unit and a second preset number of the second noise correction sub-units successively to construct and obtain the preset noise correction unit.

In one or more embodiments, the performing image-text noise correction on the first fused encoding feature and the text encoding feature using a preset noise correction unit to obtain a corrected fused feature and a corrected text encoding feature includes:
- inputting the first fused encoding feature and the text encoding feature into the first noise correction sub-unit in the preset noise correction unit, so as to perform a self-attention operation, a feature deletion operation, a layer normalization operation, and a feature addition operation on both of the first fused encoding feature and the text encoding feature to obtain first operation processing results corresponding to each of the first fused encoding feature and the text encoding feature;
- taking the first second noise correction sub-unit in the preset noise correction unit as a current second noise correction sub-unit, and taking the first operation processing results corresponding to each of the first fused encoding feature and the text encoding feature as current features to be processed;
- inputting the feature to be processed into the current second noise correction sub-unit;
- performing a cross-attention operation, the feature deletion operation, the layer normalization operation, and the feature addition operation successively on the feature to be processed using the current second noise correction sub-unit to obtain current second operation processing results corresponding to each of the first fused encoding feature and the text encoding feature; and
- obtaining the corrected text encoding feature according to the current second operation processing results.

In one or more embodiments, the obtaining the corrected text encoding feature according to the current second operation processing results includes:
- determining whether the current second noise correction sub-unit is the last one;
- in response to the current second noise correction sub-unit not being the last one, updating the current second noise correction sub-unit to a next second noise correction sub-unit, updating the feature to be processed to the current second operation processing result, and returning to perform the step of inputting the feature to be processed into the current second noise correction sub-unit; and
- in response to the current second noise correction sub-unit being the last one, taking the current second operation processing results corresponding to each of the first fused encoding feature and the text encoding feature as the corrected fused feature and the corrected text encoding feature, respectively.

In one or more embodiments, before the correcting a preset frame feature through a preset target frame correction unit using a target encoding feature determined on the basis of the corrected fused feature and the second fused encoding feature, the method further includes:
- constructing a first target frame correction sub-unit using a self-attention operation unit, a feature deletion unit, a layer normalization unit, and a feature addition unit which are constructed on the basis of the preset self-attention mechanism;
- constructing a second target frame correction sub-unit using a cross-attention operation unit, a feature deletion unit, a layer normalization unit, and a feature addition unit which are constructed on the basis of the preset cross-attention mechanism; and
- concatenating the first target frame correction sub-unit and a third preset number of the second target frame correction sub-units successively to construct and obtain the preset target frame correction unit.

In one or more embodiments, the correcting a preset frame feature through a preset target frame correction unit using a target encoding feature determined on the basis of the corrected fused feature and the second fused encoding feature includes:
- inputting the target encoding feature and the preset frame feature into the first target frame correction sub-unit in the preset target frame correction unit, so as to perform a self-attention operation, a feature deletion operation, a layer normalization operation, and a feature addition operation on both of the target encoding feature and the preset frame feature to obtain third operation processing results corresponding to each of the target encoding feature and the preset frame feature;
- taking the first second target frame correction sub-unit in the preset target frame correction unit as a current second target frame correction sub-unit, and taking the third operation processing results corresponding to each of the target encoding feature and the preset frame feature as current features to be processed;

inputting the feature to be processed into the current second target frame correction sub-unit;

performing a cross-attention operation, the feature deletion operation, the layer normalization operation, and the feature addition operation successively on the feature to be processed using the current second target frame correction sub-unit to obtain current fourth operation processing results corresponding to each of the target encoding feature and the preset frame feature; and obtaining the corrected frame feature according to the current fourth operation processing results.

In one or more embodiments, the obtaining the corrected frame feature according to the current fourth operation processing results includes:

determining whether the current second target frame correction sub-unit is the last one;

in response to the current second target frame correction sub-unit not being the last one, updating the current second target frame correction sub-unit to a next second target frame correction sub-unit, updating the feature to be processed to the current fourth operation processing result, and returning to perform the step of inputting the feature to be processed into the current second target frame correction sub-unit; and in response to the current second target frame correction sub-unit being the last one, taking the current fourth operation processing result as the corrected frame feature.

In one or more embodiments, the correcting a preset frame feature using a target encoding feature determined on the basis of the corrected fused feature and the second fused encoding feature further includes:

determining a feature obtained by performing a preset operation on the corrected fused feature or the second fused encoding feature or performing the preset operation on the corrected fused feature and the second fused encoding feature as the target encoding feature, where the preset operation includes performing feature addition or feature splicing on the corrected fused feature and the second fused encoding feature.

In one or more embodiments, a formula for the feature addition is:

$$f_{cat} = f_{modify} + f_{denoise},$$

where $f_{modify}$ is the corrected fused feature, $f_{denoise}$ is a denoised fused feature, and $f_{cat}$ is an output after the feature addition.

In one or more embodiments, a formula for the feature splicing is:

$$f_{cat} = [f_{modify}; f_{denoise}],$$

where $f_{modify}$ is the corrected fused feature, $f_{denoise}$ is a denoised fused feature, and $f_{cat}$ is an output after the feature splicing.

In one or more embodiments, the predicting a regional position coordinate of a target visual object on the target image using a corrected frame feature includes:

inputting the corrected frame feature into a coordinate predictor constructed on the basis of a first fully connected layer and a second fully connected layer, the first fully connected layer being a fully connected layer for predicting confidence levels of initial target frames, and the second fully connected layer being a fully connected layer for performing coordinate regression on the initial target frames;

determining a confidence level of each initial target frame using the coordinate predictor and the corrected frame feature; and determining the regional position coordinate of the target visual object on the target image according to the confidence level of each initial target frame and a coordinate of each initial target frame.

In one or more embodiments, the determining the regional position coordinate of the target visual object on the target image according to the confidence level of each initial target frame and a coordinate of each initial target frame includes:

sorting the confidence levels in a descending order, then screening the initial target frame with a highest confidence level from a descending order sorting result, and determining the coordinate of the screened initial target frame as the regional position coordinate of the target visual object on the target image.

In one or more embodiments, the visual positioning method further includes:

creating the preset self-attention mechanisms on the basis of a first preset formula, where the first preset formula is:

$$attn_{self}(f) = \mathrm{softmax}\left(\frac{(W_q \cdot f)^T \times (W_k \cdot f)}{\sqrt{\mathrm{size}(f)}}\right) \times (W_v \cdot f),$$

where f is an input of each preset self-attention mechanism, $W_q$, $W_k$, and $W_v$ represent a mapping matrix, size(f) represents a dimension, $attn_{self}(f)$ represents an output of the preset self-attention mechanism, and softmax represents an activation function.

In one or more embodiments, the visual positioning method further includes:

creating the preset cross-attention mechanism on the basis of a second preset formula, where the second preset formula is:

$$attn_{cross}(f, g) = \mathrm{softmax}\left(\frac{(W_q \cdot f)^T \times (W_k \cdot g)}{\sqrt{\mathrm{size}(g)}}\right) \times (W_v \cdot g),$$

where f and g represent two input features participating in a cross-attention operation each time in a cross-attention layer in the preset cross-attention mechanism, size(g) represents a dimension, $attn_{cross}(f, g)$ represents an output of the preset cross-attention mechanism, and softmax represents an activation function.

The present application also provides a visual positioning apparatus, including:

a feature splicing module, configured to encode a target image and a target text, and perform feature splicing on an image encoding feature and a text encoding feature obtained after the encoding to obtain spliced encoding features;

a first feature fusion module, configured to perform image-text feature fusion on the spliced encoding features using a preset image-text feature fusion unit constructed on the basis of a preset self-attention mechanism to obtain a first fused encoding feature;

a noise correction module, configured to perform image-text noise correction on the first fused encoding feature and the text encoding feature using a preset noise correction unit to obtain a corrected fused feature and a corrected text encoding feature, the preset noise correction unit being constructed on the basis of the preset self-attention mechanism and a preset cross-attention mechanism;

a second feature fusion module, configured to input the spliced encoding feature and the corrected text encoding feature into the preset image-text feature fusion unit to obtain a second fused encoding feature; and a target frame correction unit, configured to correct a preset frame feature through a preset target frame correction unit using a target encoding feature determined on the basis of the corrected fused feature and the second fused encoding feature, and predict a regional position coordinate of a target visual object on the target image using a corrected frame feature, the preset target frame correction unit being a unit constructed on the basis of the preset self-attention mechanism and the preset cross-attention mechanism.

The present application also provides an electronic device, including a memory and one or more processors, the memory storing computer readable instructions which, when executed by the one or more processors, cause the one or more processors to perform the steps of the above-mentioned visual positioning method.

The present application also provides one or more non-volatile computer readable storage media storing computer readable instructions which, when executed by one or more processors, cause the one or more processors to perform the steps of the above-mentioned visual positioning method.

BRIEF DESCRIPTION OF THE DRAWINGS

In order to explain these embodiments of the present application or the technical solutions in the related art more clearly, the following will briefly introduce the drawings which need to be used in the description of these embodiments or the related art. Obviously, the drawings in the description below are merely embodiments of the present application, and for a person skilled in the art, other drawings may also be obtained according to the provided drawings without involving any inventive effort.

DETAILED DESCRIPTION

The technical solutions in these embodiments of the present application will be clearly and completely described below in conjunction with the accompanying drawings in these embodiments of the present application. Obviously, the described embodiments are only some embodiments of the present application, not all embodiments. On the basis of these embodiments in the present application, all the other embodiments obtained by a person skilled in the art without involving any inventive effort fall within the scope of the present application.

In a visual positioning task, when there are some errors in an input text, it is difficult for the existing methods to find and locate an object that a sentence itself wants to describe.

Therefore, these embodiments of the present application propose a visual positioning solution, which can avoid the impact of noise generated due to human language text errors on visual positioning and realize anti-noise visual positioning.

Figure 1:
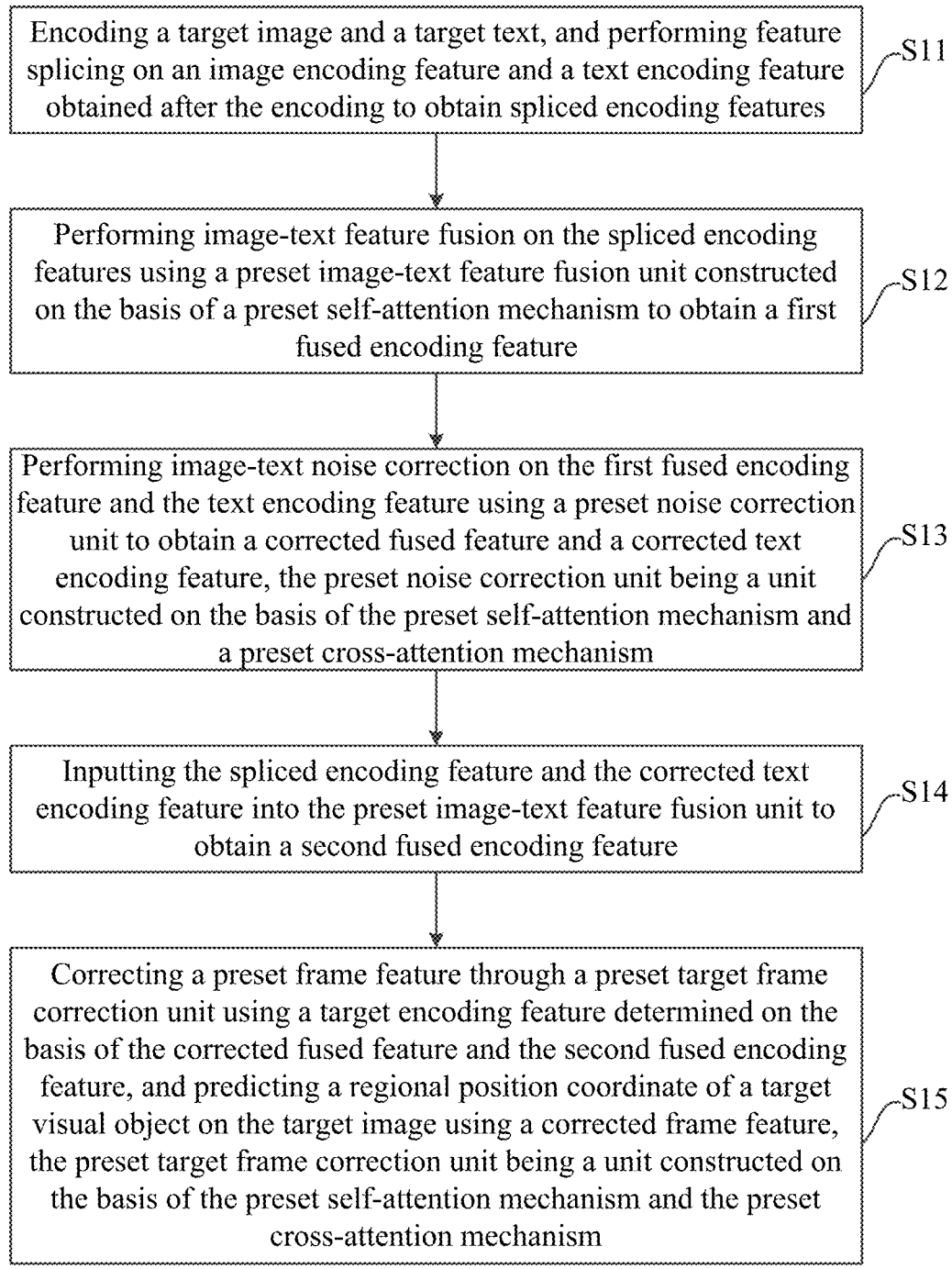
FIG. 1 is a flowchart of a visual positioning method disclosed in one or more embodiments of the present application.

An embodiment of the present application discloses a visual positioning method. As shown in FIG. 1, the method includes the following steps.

At S11, a target image and a target text are encoded, and feature splicing is performed on an image encoding feature and a text encoding feature obtained after the encoding to obtain spliced encoding features.

In this embodiment, an encoder for encoding the target image and the target text may adopt a classical model. For example, an image encoder for encoding the target image may adopt a CNN residual neural network (ResNet), ResNext, etc., and an image encoder for encoding the target text may adopt Roberta, bidirectional encoder representation from transformers (Berts), etc.

In this embodiment, feature splicing is performed on the image encoding feature and the text encoding feature obtained after the encoding to obtain the spliced encoding features. Thus, the image encoding feature and the text encoding feature may be inputted into a next processing unit as a whole.

At S12, image-text feature fusion is performed on the spliced encoding features using a preset image-text feature fusion unit constructed on the basis of a preset self-attention mechanism to obtain a first fused encoding feature.

In this embodiment, before performing image-text feature fusion on the spliced encoding features using the preset image-text feature fusion unit constructed on the basis of the preset self-attention mechanism, it is necessary to construct an image-text feature fusion sub-unit using a self-attention operation unit, a layer normalization unit, a feature deletion unit, and a feature addition unit which are constructed on the basis of the preset self-attention mechanism, and to concatenate a first preset number of the image-text feature fusion sub-units successively to construct and obtain the preset image-text feature fusion unit. The feature deletion unit is configured to randomly delete features according to a certain proportion, thus preventing a system from over-fitting.

In this embodiment, after the preset image-text feature fusion unit is constructed and obtained, the first image-text feature fusion sub-unit in the preset image-text feature fusion unit is taken as a current image-text feature fusion sub-unit, and the spliced encoding feature is taken as a feature to be processed. The feature to be processed is inputted into the current image-text feature fusion sub-unit. A self-attention operation, a layer normalization operation, a feature deletion operation, and a feature addition operation are successively performed on the feature to be processed using the current image-text feature fusion sub-unit to obtain a corresponding current operation processing result. It is determined whether the current image-text feature fusion sub-unit is the last one. If the current image-text feature fusion sub-unit is not the last one, the current image-text feature fusion sub-unit is updated to a next image-text feature fusion sub-unit, and the feature to be processed is updated to the current operation processing result, returning to perform the step of inputting the feature to be processed into the current image-text feature fusion sub-unit. If the current image-text feature fusion sub-unit is the last one, the current operation processing result is taken as the first fused encoding feature.

It should be noted that the process of performing the self-attention operation, the layer normalization operation, the feature deletion operation, and the feature addition operation successively on the feature to be processed using the current image-text feature fusion sub-unit to obtain a corresponding operation processing result includes: performing the self-attention operation on the feature to be processed using the self-attention operation unit in the current image-text feature fusion sub-unit to obtain a first operation feature; performing layer normalization on the first operation feature using the layer normalization unit in the current image-text feature fusion sub-unit to obtain a second operation feature; performing the feature deletion operation on the second operation feature using the feature deletion unit in the current image-text feature fusion sub-unit according to a preset proportion to obtain a third operation feature; and performing the feature addition operation on the third operation feature and the feature to be processed using the feature addition unit in the current image-text feature fusion sub-unit to obtain the operation processing result in the current image-text feature fusion sub-unit.

It should be noted that, in this embodiment, when performing the first image-text feature fusion on the spliced encoding features using the preset image-text feature fusion unit constructed on the basis of the preset self-attention mechanism, the emphasis is placed on describing an image-text matching relationship, i.e., inferring an unmatched part (noise part) between the target image and the target text on the basis of the image-text matching relationship.

At S13, image-text noise correction is performed on the first fused encoding feature and the text encoding feature using a preset noise correction unit to obtain a corrected fused feature and a corrected text encoding feature, the preset noise correction unit being a unit constructed on the basis of the preset self-attention mechanism and a preset cross-attention mechanism.

It should be noted that, compared with the traditional visual positioning method, this embodiment newly adds the preset noise correction unit constructed on the basis of the preset self-attention mechanism and the preset cross-attention mechanism. Thus, the image-text noise correction may be performed on the first fused encoding feature and the text encoding feature on the basis of the preset cross-attention mechanism to reduce the attention on the noise part in the text, and thus the impact of noise is weakened, and the anti-noise visual positioning is achieved. In this embodiment, before performing image-text noise correction on the first fused encoding feature and the text encoding feature using the preset noise correction unit, the step further includes: constructing a first noise correction sub-unit using a self-attention operation unit, a feature deletion unit, a layer normalization unit, and a feature addition unit which are constructed on the basis of the preset self-attention mechanism; constructing a second noise correction sub-unit using a cross-attention operation unit, a feature deletion unit, a layer normalization unit, and a feature addition unit which are constructed on the basis of the preset cross-attention mechanism; and concatenating the first noise correction sub-unit and a second preset number of the second noise correction sub-units successively to construct and obtain the preset noise correction unit.

At S14, the spliced encoding feature and the corrected text encoding feature are inputted into the preset image-text feature fusion unit to obtain a second fused encoding feature.

In this embodiment, when performing the second image-text feature fusion on the spliced encoding feature and the corrected text encoding feature using the preset image-text feature fusion unit constructed on the basis of the preset self-attention mechanism, the emphasis is placed on fusing the image-text features. It can be seen from the above-mentioned disclosure that when the first image-text feature fusion is performed, the unmatched part (noise part) between the target image and the target text is determined. Therefore, in this embodiment, the emphasis is placed on fusing the image-text features on the premise that the noise part is known.

At S15, a preset frame feature is corrected through a preset target frame correction unit using a target encoding feature determined on the basis of the corrected fused feature and the second fused encoding feature, and a regional position coordinate of a target visual object on the target image is predicted using a corrected frame feature, the preset target frame correction unit being a unit constructed on the basis of the preset self-attention mechanism and the preset cross-attention mechanism.

In this embodiment, before correcting the preset frame feature, it is necessary to determine a feature obtained by performing a preset operation on the corrected fused feature or the second fused encoding feature or performing the preset operation on the corrected fused feature and the second fused encoding feature as the target encoding feature, where the preset operation includes performing feature addition or feature splicing on the corrected fused feature and the second fused encoding feature. Thus, the preset frame feature may be corrected using the target encoding feature.

In this embodiment, predicting the regional position coordinate of the target visual object on the target image using the corrected frame feature specifically includes: inputting the corrected frame feature into a coordinate predictor constructed on the basis of a first fully connected layer and a second fully connected layer, the first fully connected layer being a fully connected layer for predicting confidence levels of initial target frames, and the second fully connected layer being a fully connected layer for performing coordinate regression on the initial target frames; determining a confidence level of each initial target frame using the coordinate predictor and the corrected frame feature; and sorting the confidence levels in a descending order, then screening the initial target frame with a highest confidence level from a descending order sorting result, and determining the coordinate of the screened initial target frame as the regional position coordinate of the target visual object on the target image.

In this embodiment, before correcting the preset frame feature through the preset target frame correction unit using the target encoding feature determined on the basis of the corrected fused feature and the second fused encoding feature, the step further includes: constructing a first target frame correction sub-unit using a self-attention operation unit, a feature deletion unit, a layer normalization unit, and a feature addition unit which are constructed on the basis of the preset self-attention mechanism; constructing a second target frame correction sub-unit using a cross-attention operation unit, a feature deletion unit, a layer normalization unit, and a feature addition unit which are constructed on the basis of the preset cross-attention mechanism; and concatenating the first target frame correction sub-unit and a third preset number of the second target frame correction sub-units successively to construct and obtain the preset target frame correction unit.

It can be seen that the present application discloses a visual positioning method, including: encoding the target image and the target text, and performing feature splicing on the image encoding feature and the text encoding feature obtained after the encoding to obtain the spliced encoding features; performing image-text feature fusion on the spliced encoding features using the preset image-text feature fusion unit constructed on the basis of the preset self-attention mechanism to obtain the first fused encoding feature; performing image-text noise correction on the first fused encoding feature and the text encoding feature using the preset noise correction unit to obtain the corrected fused feature and the corrected text encoding feature, the preset noise correction unit being the unit constructed on the basis of the preset self-attention mechanism and the preset cross-attention mechanism; inputting the spliced encoding feature and the corrected text encoding feature into the preset image-text feature fusion unit to obtain the second fused encoding feature; and correcting the preset frame feature through the preset target frame correction unit using the target encoding feature determined on the basis of the corrected fused feature and the second fused encoding feature, and predicting the regional position coordinate of the target visual object on the target image using the corrected frame feature, the preset target frame correction unit being the unit constructed on the basis of the preset self-attention mechanism and the preset cross-attention mechanism. It can be seen that, in the present application, the image-text noise correction is performed through the noise correction unit constructed on the basis of the preset self-attention mechanism and the preset cross-attention mechanism. In the process of processing on the basis of the cross-attention mechanism, a difference between the text and the image cannot find a matching relationship in the image, thus reducing the attention on an image-text noise component, thereby weakening the impact of image-text noise on the accuracy of visual positioning, and also achieving the anti-noise visual positioning.

Figure 2:
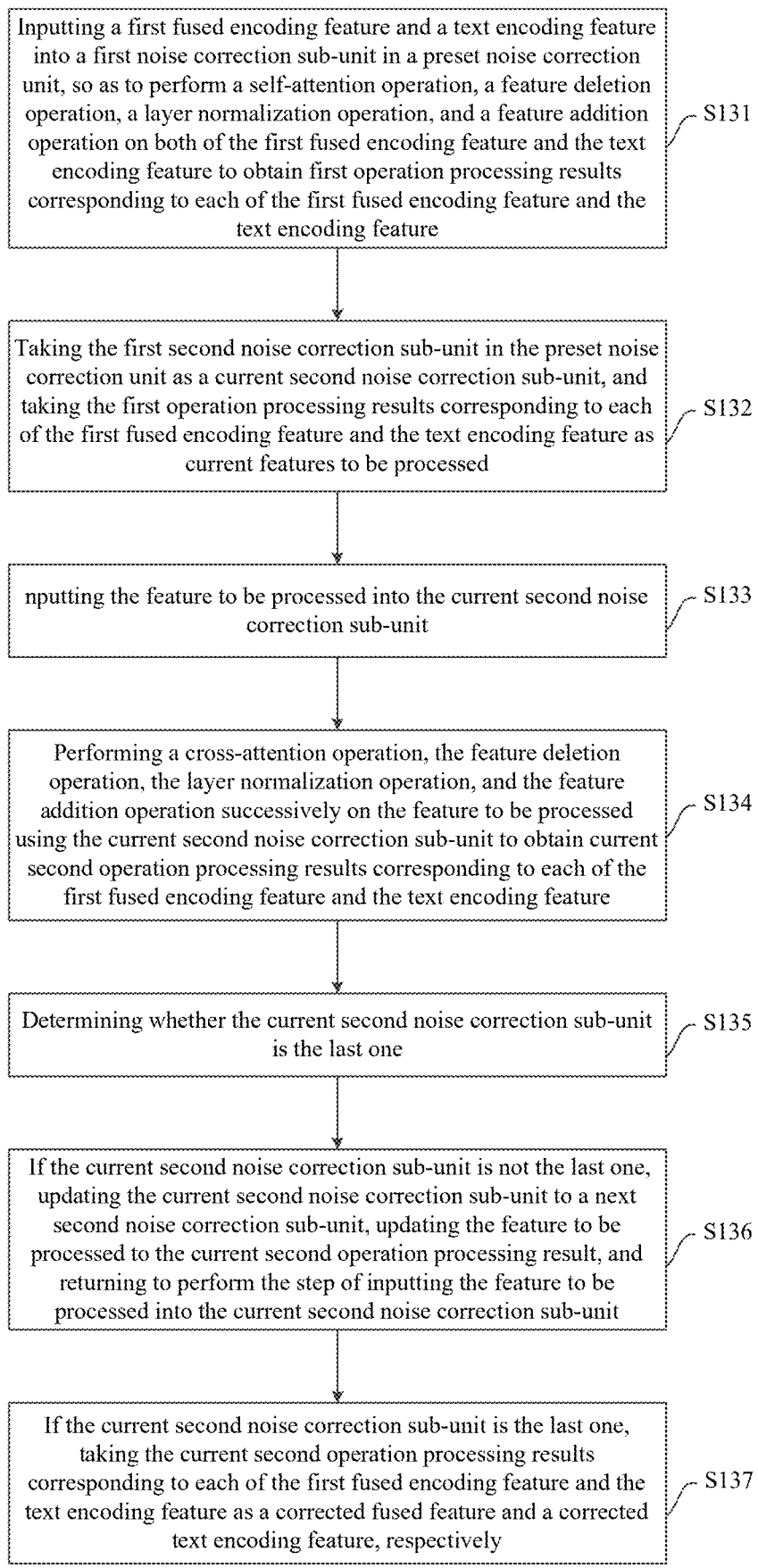
FIG. 2 is a sub-flowchart of a specific visual positioning method disclosed in one or more embodiments of the present application.

Further, this embodiment is described and explained in detail with respect to the process of performing image-text noise correction on the first fused encoding feature and the text encoding feature using the preset noise correction unit in S13 of the aforementioned embodiment. Specifically, as shown in FIG. 2, the above-mentioned S13 includes the following steps.

At S131, the first fused encoding feature and the text encoding feature are inputted into the first noise correction sub-unit in the preset noise correction unit, so as to perform a self-attention operation, a feature deletion operation, a layer normalization operation, and a feature addition operation on both of the first fused encoding feature and the text encoding feature to obtain first operation processing results corresponding to each of the first fused encoding feature and the text encoding feature.

At S132, the first second noise correction sub-unit in the preset noise correction unit is taken as a current second noise correction sub-unit, and the first operation processing results corresponding to each of the first fused encoding feature and the text encoding feature are taken as current features to be processed.

At S133, the feature to be processed is inputted into the current second noise correction sub-unit.

At S134, a cross-attention operation, the feature deletion operation, the layer normalization operation, and the feature addition operation are successively performed on the feature to be processed using the current second noise correction sub-unit to obtain current second operation processing results corresponding to each of the first fused encoding feature and the text encoding feature.

At S135, it is determined whether the current second noise correction sub-unit is the last one.

At S136, if the current second noise correction sub-unit is not the last one, the current second noise correction sub-unit is updated to a next second noise correction sub-unit, and the feature to be processed is updated to the current second operation processing result, returning to perform the step of inputting the feature to be processed into the current second noise correction sub-unit.

At S137, if the current second noise correction sub-unit is the last one, the current second operation processing results corresponding to each of the first fused encoding feature and the text encoding feature are taken as the corrected fused feature and the corrected text encoding feature, respectively.

That is to say, in this embodiment, the image-text noise correction is performed on the first fused encoding feature and the text encoding feature on the basis of the preset self-attention mechanism and the preset cross-attention mechanism to reduce the attention on the noise part in the text, and thus the impact of noise is weakened, and the anti-noise visual positioning is achieved.

It can be seen that, in the present application, the image-text noise correction is performed through the noise correction unit constructed on the basis of the preset self-attention mechanism and the preset cross-attention mechanism. In the process of processing on the basis of the cross-attention mechanism, the difference between the text and the image cannot find a matching relationship in the image, thus reducing the attention on the image-text noise component, thereby weakening the impact of image-text noise on the accuracy of visual positioning, and also achieving the anti-noise visual positioning.

Figure 3:
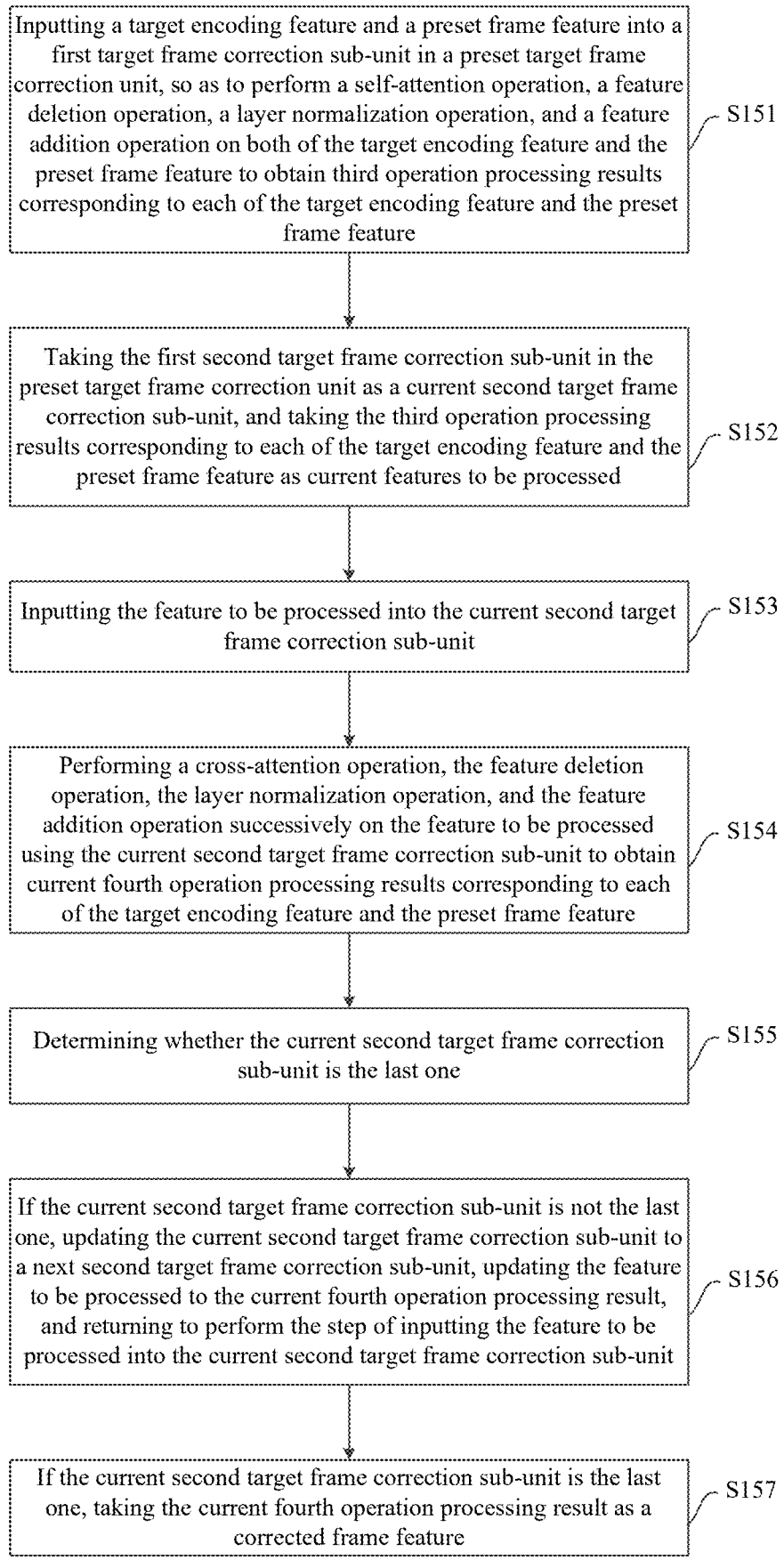
FIG. 3 is a sub-flowchart of a specific visual positioning method disclosed in one or more embodiments of the present application.

Further, this embodiment is described and explained in detail with respect to the process of correcting the preset frame feature in step S15 of the aforementioned embodiment. Referring to FIG. 3, the above-mentioned process of correcting the preset frame feature in step S15 specifically includes the following steps.

At S151, the target encoding feature and the preset frame feature are inputted into the first target frame correction sub-unit in the preset target frame correction unit, so as to perform a self-attention operation, a feature deletion operation, a layer normalization operation, and a feature addition operation on both of the target encoding feature and the preset frame feature to obtain third operation processing results corresponding to each of the target encoding feature and the preset frame feature.

At S152, the first second target frame correction sub-unit in the preset target frame correction unit is taken as a current second target frame correction sub-unit, and the third operation processing results corresponding to each of the target encoding feature and the preset frame feature are taken as current features to be processed.

At S153, the feature to be processed is inputted into the current second target frame correction sub-unit.

At S154, a cross-attention operation, the feature deletion operation, the layer normalization operation, and the feature addition operation are successively performed on the feature to be processed using the current second target frame correction sub-unit to obtain current fourth operation processing results corresponding to each of the target encoding feature and the preset frame feature.

At S155, it is determined whether the current second target frame correction sub-unit is the last one.

At S156, if the current second target frame correction sub-unit is not the last one, the current second target frame correction sub-unit is updated to a next second target frame correction sub-unit, and the feature to be processed is updated to the current fourth operation processing result, returning to perform the step of inputting the feature to be processed into the current second target frame correction sub-unit.

At S157, if the current second target frame correction sub-unit is the last one, the current fourth operation processing result is taken as the corrected frame feature.

That is, in this embodiment, the preset target frame correction unit is constructed and obtained on the basis of the preset self-attention mechanism and the preset cross-attention mechanism. Thus, the preset frame feature is corrected, and the corrected feature is used for predicting the regional position coordinate of the target visual object on the target image.

Figure 4:
FIG. 4 is a schematic structural diagram of a traditional visual positioning task.
Figure 4:
Figure 5:
FIG. 5 is a schematic structural diagram of an anti-noise visual positioning task disclosed in one or more embodiments of the present application.
Figure 5:

FIG. 4 is a schematic structural diagram of a tradition visual positioning task when the human language is correct. FIG. 5 is a schematic structural diagram of an anti-noise visual positioning task when the human language is wrong as disclosed in the present application.

There is noise in an input text in FIG. 5. That is, a color of the girl's clothes in the figure is red. The anti-noise visual positioning task needs to infer "red" as noise according to correct information of "girl" and "skirt" herein, so as to accurately understand the target that the text originally intended to describe and locate its position coordinates.

Figure 6:
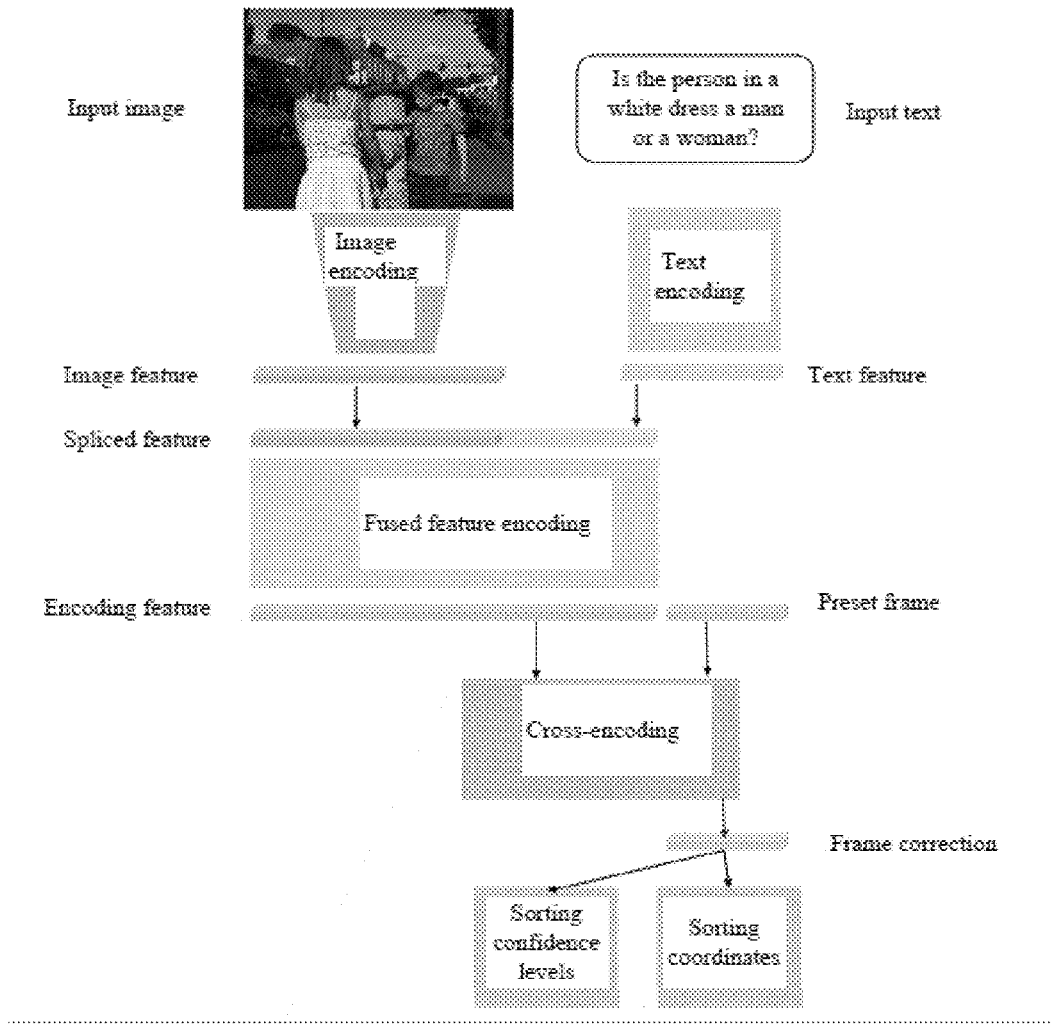
FIG. 6 is a flowchart of a traditional visual positioning method.

FIG. 6 is a flowchart of a conventional visual positioning method. Firstly, the image encoder and the text encoder are set to encode the inputted image and text, and the image feature and the text feature obtained after the encoding are spliced, and then the features obtained after the splicing are fused and encoded to obtain the fused encoding feature. A set of preset frames are set to simulate frame information. Generally, a zero matrix with a size of [n, d] is set, n represents a preset number, and d represents a dimension of a feature. Cross-encoding is performed on the fused encoding feature and the preset frame feature to correct the preset frame feature. Confidence level prediction and coordinate position regression are performed on the corrected frame information, and the frame coordinate with a highest confidence level is determined as a final output of a visual positioning system. It should be noted that, since the traditional visual positioning method cannot solve the problem of noise in the text during processing, when there is noise in the text, there is an error in visual positioning using the traditional visual positioning method.

Figure 7:
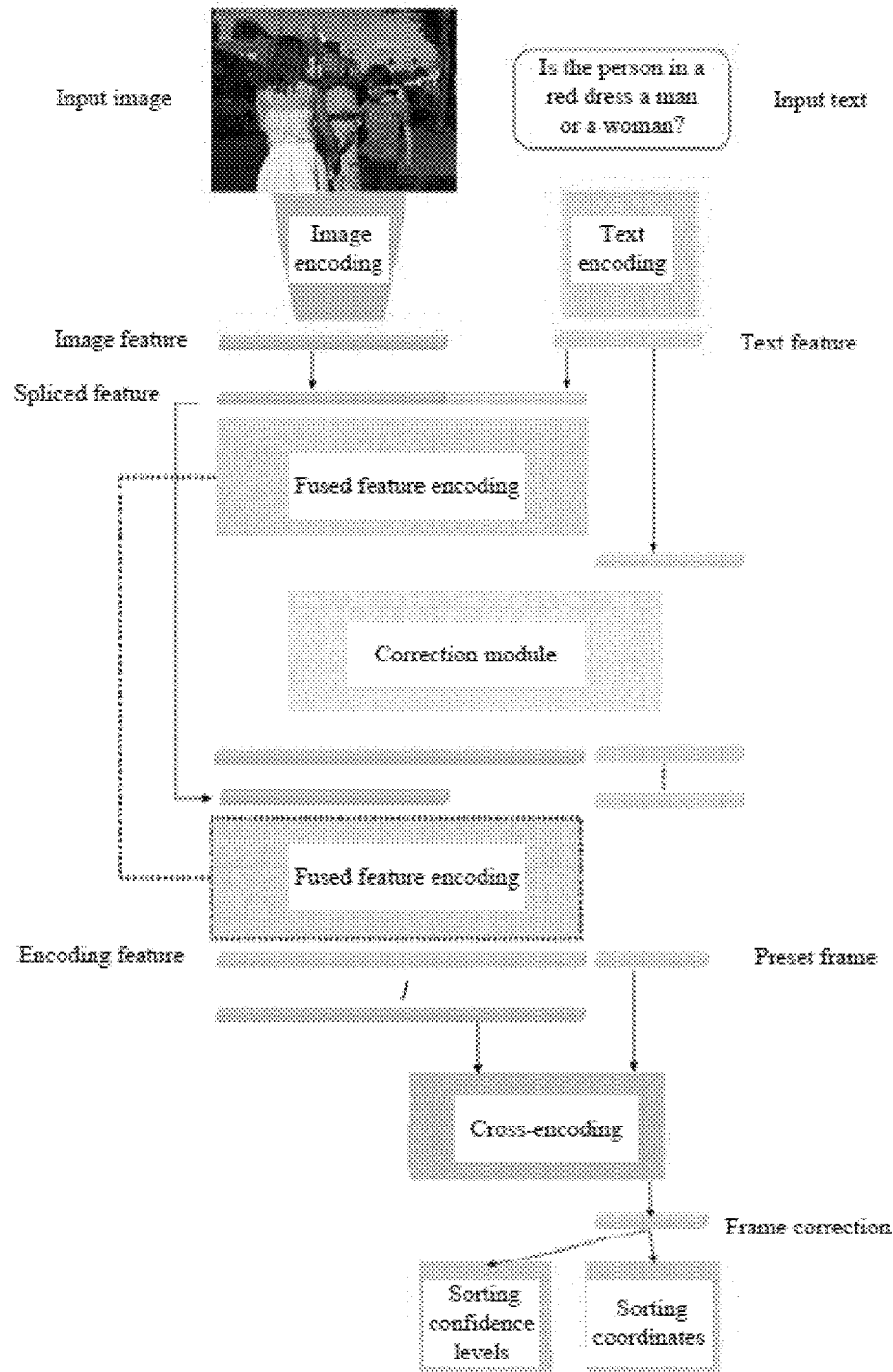
FIG. 7 is a flowchart of a specific visual positioning method disclosed in one or more embodiments of the present application.

FIG. 7 is a flowchart of a specific anti-noise visual positioning method disclosed in the present application. Compared with the traditional method, the present application adds the noise correction unit to achieve the purpose of anti-noise, thereby achieving the function of anti-noise visual positioning. The visual positioning method flow of the present application specifically includes encoders for images and texts, the preset image-text feature fusion unit, the preset noise correction unit, a cross-encoding unit, and a coordinate predictor.

(1) Preset Image-Text Feature Fusion Unit

The preset image-text feature fusion unit, also called a fusion encoder, is configured to fuse image and text features so as to learn a matching relationship between the image and the text. The module has two functions, on the one hand, it may be configured to encode the relationship between the image and the text. Therefore, for the case where the text is noisy, the encoder may realize the difference encoding between the image and the text, and finally may be configured to generate the matching relationship between the image and the text. On the other hand, it may be configured to perform image-text feature fusion, which is significant for the visual positioning task itself, so it may be placed before the final positioning module as an encoder. The module appears twice in the system involved in the present application. The first time focuses on describing the image-text matching relationship, and the second time is used for fusing the image-text features. Since the two functions do not conflict, in order to save the calculation power, weights of the two modules are shared.

Figure 8:
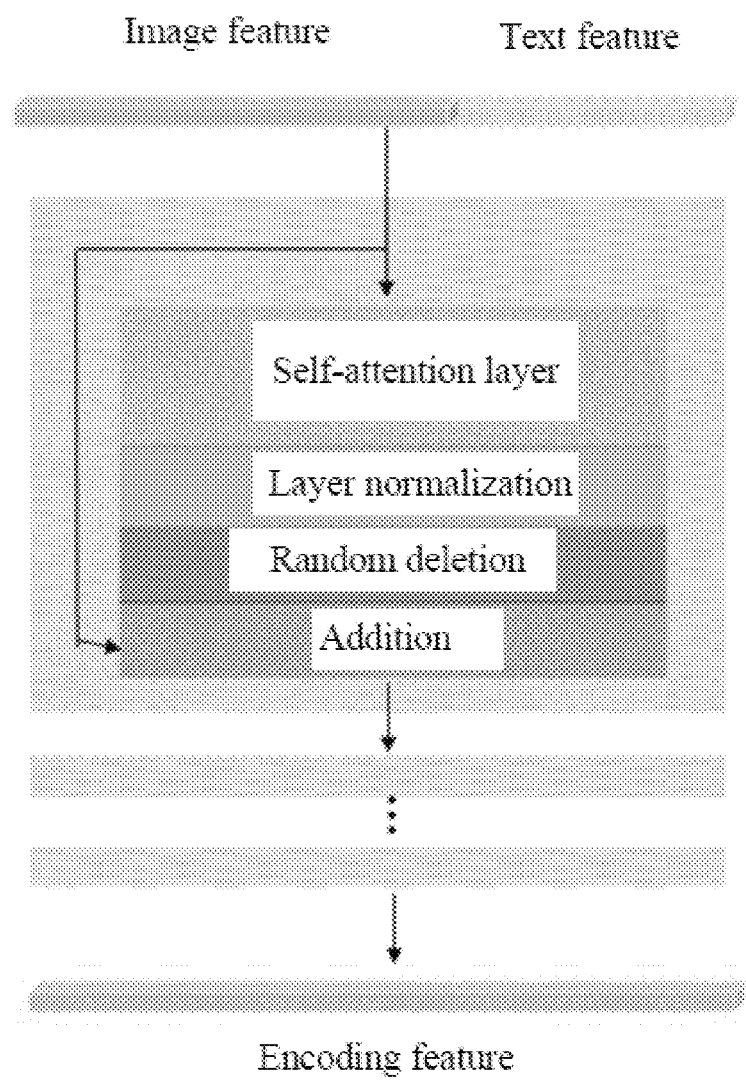
FIG. 8 is a schematic structural diagram of a preset image-text feature fusion unit disclosed in one or more embodiments of the present application.

A schematic structural diagram of a preset image-text feature fusion unit designed in the present application is shown in FIG. 8. Firstly, the image encoding feature $f_{raw}$ and the text encoding feature $g_{raw}$ are spliced, and then inputted into a first preset number of image-text feature fusion sub-units for encoding to obtain a final fused encoding feature. Each image-text feature fusion sub-unit includes one self-attention layer, one layer normalization, one random deletion layer, and one addition module. In the self-attention layer, preset self-attention mechanisms are created on the basis of a first preset formula.

The first preset formula is:

$$attn_{self}(f) = \text{softmax}\left(\frac{(W_q \cdot f)^T \times (W_k \cdot f)}{\sqrt{size(f)}}\right) \times (W_v \cdot f).$$

f is an input of each self-attention operation unit, $W_q$, $W_k$, and $W_v$ represent a mapping matrix, $$\text{softmax}(x) = \frac{e^x}{\sum_{j=1}^{n} e^x},$$

and size(f) represents a dimension.

The random deletion layer is configured to randomly delete the features in proportion, and the function of this layer is to prevent the system from over-fitting.

(2) Preset Noise Correction Unit

Figure 9:
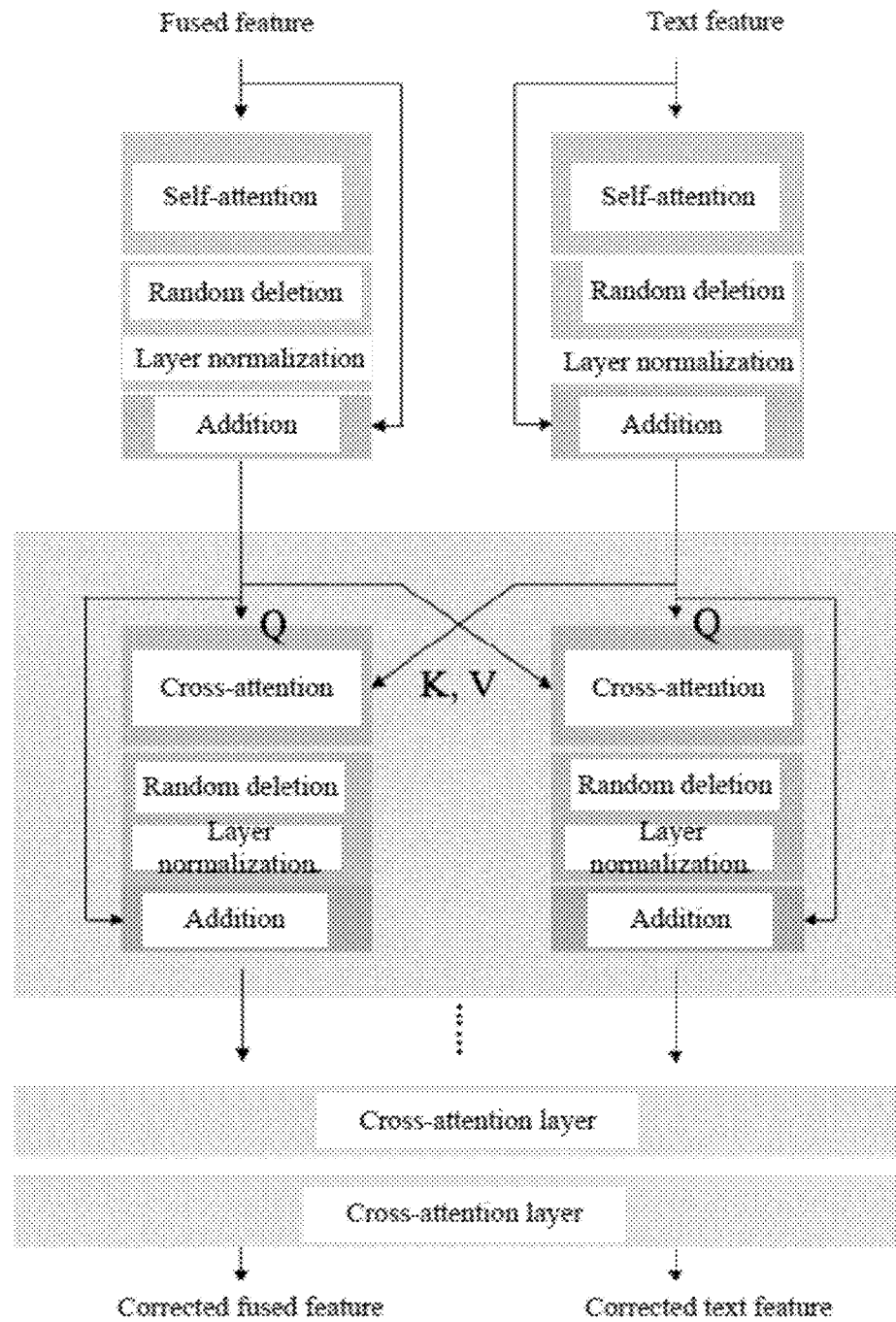
FIG. 9 is a schematic structural diagram of a preset noise correction unit disclosed in one or more embodiments of the present application.

The preset noise correction unit, also called a correction module, has the main function of repairing noise and is a key step in a denoising process, and its input is an output "fused encoding feature" of the preset image-text feature fusion unit and an output "text encoding feature" of the text encoder, and its output is the corrected fused feature and the corrected text encoding feature, as shown in FIG. 9. The preset noise correction unit includes the first noise correction sub-unit and the second preset number of the second noise correction sub-units. The first noise correction sub-unit includes one self-attention layer, one layer normalization, one random deletion layer, and one addition module. In the self-attention layer, the preset self-attention mechanisms are created on the basis of the first preset formula. The second noise correction sub-unit includes one cross-attention layer, one layer normalization, one random deletion layer, and one addition module. In the cross-attention layer, a preset cross-attention mechanism is created on the basis of a second preset formula.

The second preset formula is:

$$attn_{cross}(f, g) = \text{softmax}\left(\frac{(W_q \cdot f)^T \times (W_k \cdot g)}{\sqrt{\text{size}(g)}}\right) \times (W_v \cdot g).$$

f and g represent two input features participating in a cross-attention operation each time in the cross-attention layer, size(g) represents a dimension.

The preset noise correction unit weakens noise between the image and the text by designing a cross-attention mechanism. For example, with regard to FIG. 5, since "red" in the text cannot find a corresponding matching relationship in the image, its attention will be low. After the superposition of several layers, the attention of the model on "red" will be lower and lower, and finally the noise of "red" is not sufficient to affect the model performance. Therefore, the module designs the cross-attention layer and achieves the denoising function through repeated superposition.

(3) Preset Target Frame Correction Unit

Figure 10:
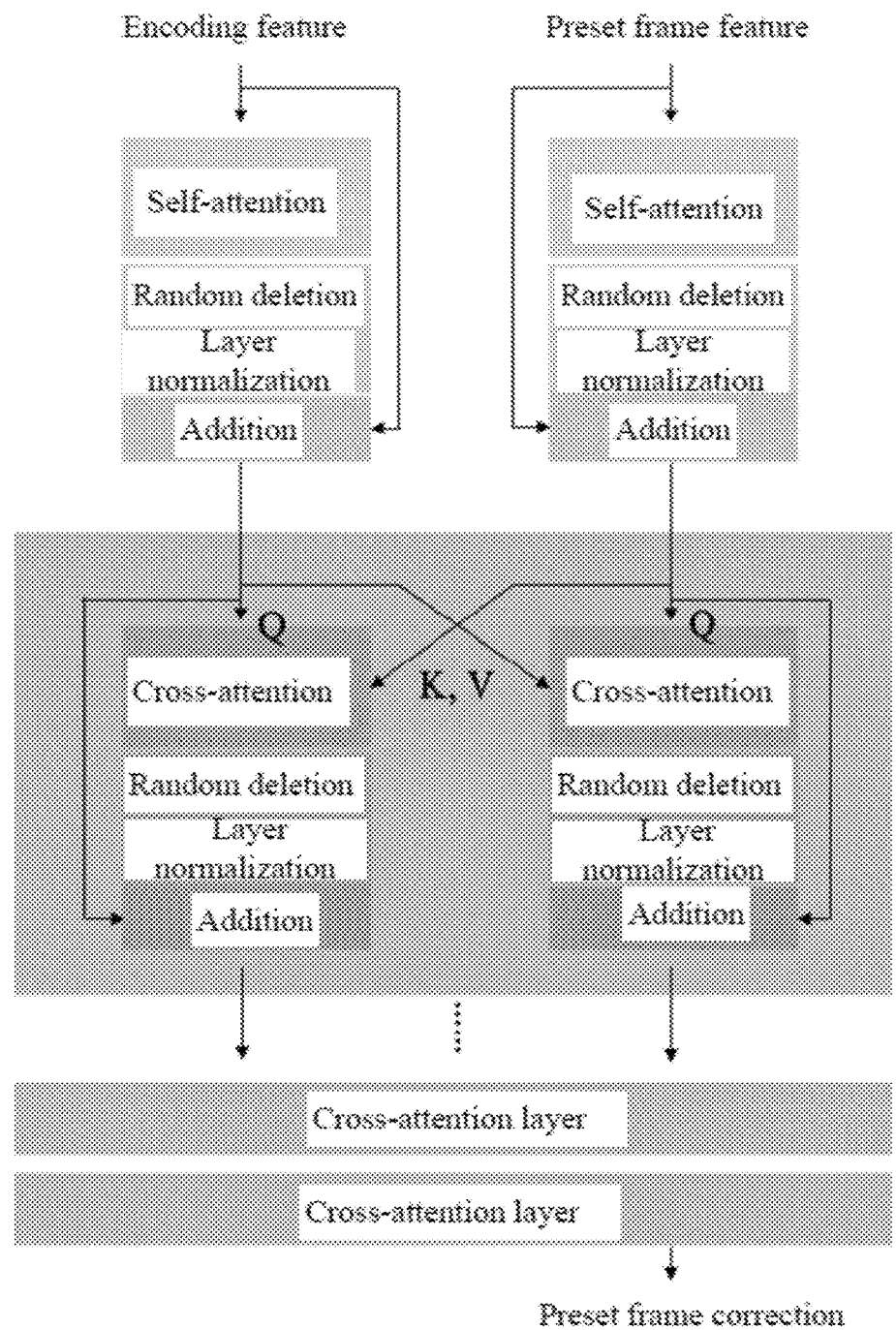
FIG. 10 is a schematic structural diagram of a preset target frame correction unit disclosed in one or more embodiments of the present application.

The preset target frame correction unit, also called a cross-encoding module, is configured to correct the preset frame feature, and the corrected feature is used for predicting the regional position coordinate of the target visual object on the target image. Referring to FIG. 10, the preset target frame correction unit includes one first preset target frame correction sub-unit and the third preset number of the second preset target frame correction sub-units. The first preset target frame correction sub-unit includes one self-attention layer, one layer normalization, one random deletion layer, and one addition module. In the self-attention layer, the preset self-attention mechanisms are created on the basis of the first preset formula. The second preset target frame correction sub-unit includes one cross-attention layer, one layer normalization, one random deletion layer, and one addition module. In the cross-attention layer, the preset cross-attention mechanism is created on the basis of the second preset formula.

In addition, the present application proposes the fusion of encoding features. For the input of the cross-encoding module, there are two fused features both having the potential for visual positioning: the first is a "corrected fused feature" $f_{modify}$ corrected by the correction module; the second is a "denoised fused feature" $f_{denoise}$ obtained by encoding the output "corrected text feature" of the correction module and the image encoding feature again using a fusion encoder. Thus, in the present application, three cross-encoded input settings are provided. 1, $f_{modify}$ is used; 2, $f_{denoise}$ is used; 3, feature splicing or feature addition is performed on the two.

Formulas of the feature splicing and the feature adding are:

$$f_{cat} = [f_{modify}; f_{denoise}], f_{cat} = f_{modify} + f_{denoise}.$$

(4) Coordinate Predictor

Figure 11:
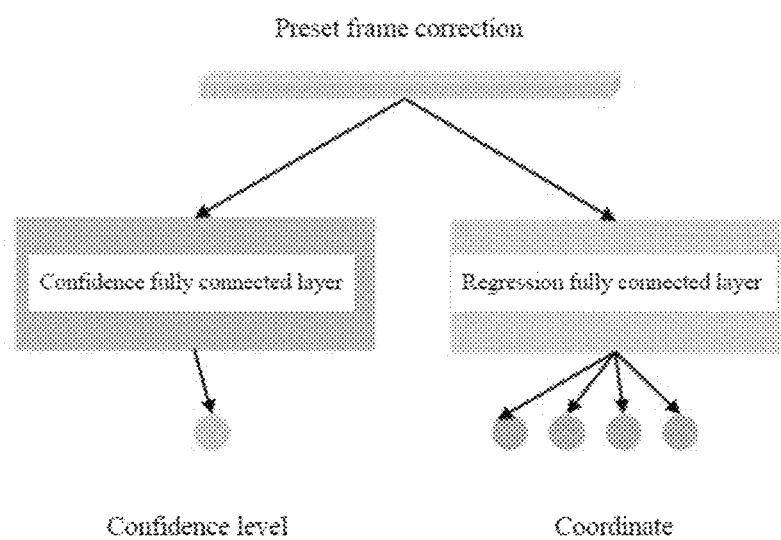
FIG. 11 is a schematic structural diagram of a coordinate predictor disclosed in one or more embodiments of the present application.

The coordinate predictor is constructed on the basis of the first fully connected layer and the second fully connected layer. As shown in FIG. 11, the first fully connected layer is the fully connected layer for predicting the confidence levels of the initial target frames, and the second fully connected layer is the fully connected layer for performing coordinate regression on the initial target frames. The confidence level of each initial target frame is determined using the coordinate predictor and the corrected frame feature. The confidence levels are sorted in a descending order, then the initial target frame with the highest confidence level is screened from the descending order sorting result, and the coordinate of the screened initial target frame is determined as the regional position coordinate of the target visual object on the target image. Specifically, the frame k with the highest confidence level in the corrected feature (with a size of [n, d]) may be obtained by sorting the confidence levels, and the k-th coordinate is outputted as the final output of the visual positioning system.

Figure 12:
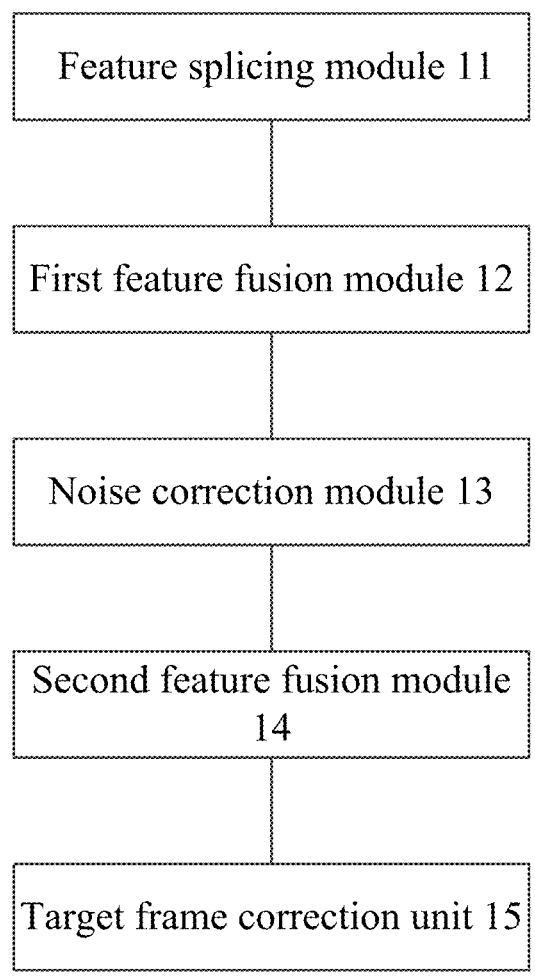
FIG. 12 is a schematic structural diagram of a visual positioning apparatus disclosed in one or more embodiments of the present application.

Accordingly, an embodiment of the present application further discloses a visual positioning apparatus, and as shown in FIG. 12, the apparatus includes:

a feature splicing module 11, configured to encode a target image and a target text, and perform feature splicing on an image encoding feature and a text encoding feature obtained after the encoding to obtain spliced encoding features;

a first feature fusion module 12, configured to perform image-text feature fusion on the spliced encoding features using a preset image-text feature fusion unit constructed on the basis of a preset self-attention mechanism to obtain a first fused encoding feature;

a noise correction module 13, configured to perform image-text noise correction on the first fused encoding feature and the text encoding feature using a preset noise correction unit to obtain a corrected fused feature and a corrected text encoding feature, the preset noise correction unit being constructed on the basis of the preset self-attention mechanism and a preset cross-attention mechanism;

a second feature fusion module 14, configured to input the spliced encoding feature and the corrected text encoding feature into the preset image-text feature fusion unit to obtain a second fused encoding feature; and a target frame correction unit 15, configured to correct a preset frame feature through a preset target frame correction unit using a target encoding feature determined on the basis of the corrected fused feature and the second fused encoding feature, and predict a regional position coordinate of a target visual object on the target image using a corrected frame feature, the preset target frame correction unit being a unit constructed on the basis of the preset self-attention mechanism and the preset cross-attention mechanism.

Herein, a more specific working process of each of the above-mentioned modules may refer to the corresponding contents disclosed in the aforementioned embodiments, and will not be described in detail.

It can be seen that the present application discloses a visual positioning method, including: encoding the target image and the target text, and performing feature splicing on the image encoding feature and the text encoding feature obtained after the encoding to obtain the spliced encoding features; performing image-text feature fusion on the spliced encoding features using the preset image-text feature fusion unit constructed on the basis of the preset self-attention mechanism to obtain the first fused encoding feature; performing image-text noise correction on the first fused encoding feature and the text encoding feature using the preset noise correction unit to obtain the corrected fused feature and the corrected text encoding feature, the preset noise correction unit being the unit constructed on the basis of the preset self-attention mechanism and the preset cross-attention mechanism; inputting the spliced encoding feature and the corrected text encoding feature into the preset image-text feature fusion unit to obtain the second fused encoding feature; and correcting the preset frame feature through the preset target frame correction unit using the target encoding feature determined on the basis of the corrected fused feature and the second fused encoding feature, and predicting the regional position coordinate of the target visual object on the target image using the corrected frame feature, the preset target frame correction unit being the unit constructed on the basis of the preset self-attention mechanism and the preset cross-attention mechanism. It can be seen that, in the present application, the image-text noise correction is performed through the noise correction unit constructed on the basis of the preset self-attention mechanism and the preset cross-attention mechanism. In the process of processing on the basis of the cross-attention mechanism, a difference between the text and the image cannot find a matching relationship in the image, thus reducing the attention on an image-text noise component, thereby weakening the impact of image-text noise on the accuracy of visual positioning, and also achieving the anti-noise visual positioning.

Figure 13:
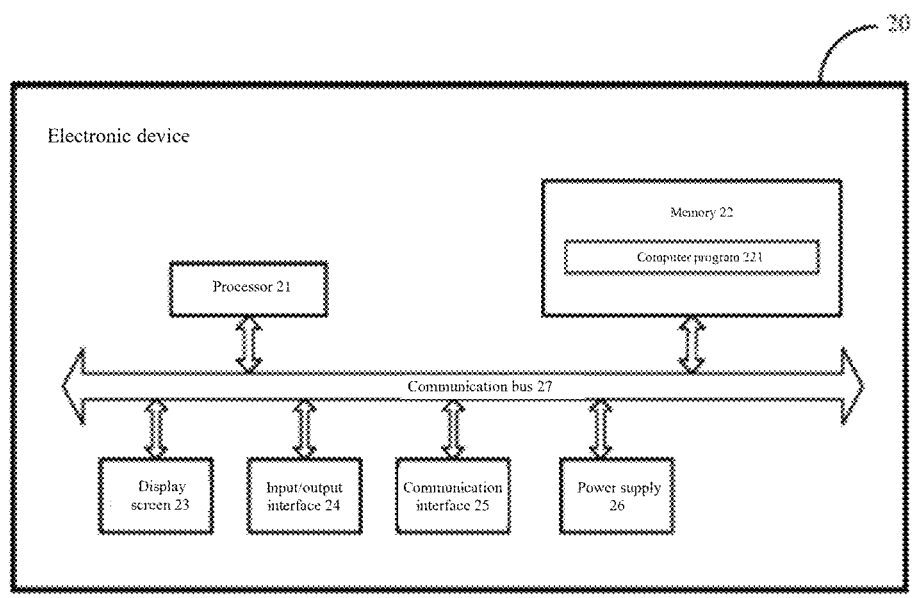
FIG. 13 is a structural diagram of an electronic device disclosed in one or more embodiments of the present application.

Further, an embodiment of the present application also provides an electronic device. FIG. 13 is a structural diagram of an electronic device 20 according to an exemplary embodiment, the contents of which are not to be construed as limiting the scope of the present application in any way.

FIG. 13 is a schematic structural diagram of an electronic device 20 provided in an embodiment of the present application. The electronic device 20 may specifically include at least one processor 21, at least one memory 22, a display screen 23, an input/output interface 24, a communication interface 25, a power supply 26, and a communication bus 27. The memory 22 is configured to store computer readable instructions which are loaded and executed by the processor 21 to implement the relevant steps in the visual positioning method disclosed in any one of the aforementioned embodiments. In addition, the electronic device 20 in this embodiment may specifically be an electronic computer.

In this embodiment, the power supply 26 is configured to provide working voltages for various hardware devices on the electronic device 20. The communication interface 25 may create a data transmission channel between the electronic device 20 and an external device, and a communication protocol followed thereby is any communication protocol which may be applied to the technical solution of the present application, and is not specifically limited here. The input/output interface 24 is configured to acquire external input data or output data to the outside, and its specific interface type may be selected according to specific application requirements, and is not specifically limited here.

In addition, the memory 22 serves as a carrier for the storage of resources, which may be a read only memory (ROM), a random access memory (RAM), magnetic or optical disks, etc., the resources stored thereon may include computer readable instructions 221, and the storage may be transient or permanent. The computer readable instructions 221 may further include computer readable instructions that can be used for performing other particular tasks in addition to the computer readable instructions that can be used for performing the visual positioning method performed by the electronic device 20 disclosed in any of the aforementioned embodiments.

Further, these embodiments of the present application also disclose one or more non-volatile computer readable storage media storing computer readable instructions for storing the computer readable instructions. The computer readable instructions, when executed by one or more processors, implement the previously disclosed visual positioning method.

With regard to the specific steps of the method, reference may be made to the corresponding disclosure in the aforementioned embodiments, which will not be described in detail herein.

Various embodiments in the present application are described in a progressive manner, and each embodiment focuses on the differences with other embodiments, and the same or similar parts of these embodiments may refer to each other. For the apparatus disclosed in these embodiments, since it corresponds to the method disclosed in these embodiments, the description is relatively simple, and the description in the method section where relevant may be referred to.

A person skilled in the art will further appreciate that the units and algorithm steps of the examples described in connection with these embodiments disclosed herein may be implemented by electronic hardware, computer software, or combinations of the two. In order to clearly illustrate the interchangeability of hardware and software, the composition and steps of the examples have been described in the above description in general terms according to the functions. Whether these functions are performed in hardware or software depends on the particular application and design constraints of the technical solutions. A person skilled in the art may use different methods for each particular application to achieve the described functions, but such implementations should not be considered beyond the scope of the present application.

The steps of the method or algorithm described in connection with these embodiments disclosed herein may be implemented directly in hardware, in a software module executed by the processor, or in a combination of the two.

The software module may be placed in a RAM, a memory, a ROM, an electrically programmable ROM, an electrically erasable programmable ROM, a register, a hard disk, a removable disk, a CD-ROM, or any other form of storage medium known in the art.

Finally, it should also be noted that relational terms such as first and second herein are used solely to distinguish one entity or operation from another entity or operation without necessarily requiring or implying any actual such relationship or order between these entities or operations. Moreover, the terms "comprising", "containing", or any other variation thereof, are intended to cover a non-exclusive inclusion, such that a process, a method, an article, or a device that includes a list of elements does not include only those elements but may include other elements not expressly listed or inherent to such process, method, article, or device. An element proceeded by the phrase "comprising a" does not, without more constraints, preclude the existence of additional identical elements in the process, method, article, or device that includes the element.

A visual positioning method and apparatus, a device, and a storage medium provided by the present application are described in detail above. While the principles and implementations of the present application have been described herein with reference to specific examples, the description of the above embodiments is only used to help understand the method and core ideas of the present application. At the same time, for a person skilled in the art, according to the idea of the present application, there would be changes in the specific implementations and the application scope. In summary, the contents of the present description should not be construed as limiting the present application.

What is claimed is:

1. A visual positioning method, comprising:
    encoding a target image and a target text, and performing feature splicing on an image encoding feature and a text encoding feature obtained after the encoding to obtain spliced encoding features;
    performing image-text feature matching on the spliced encoding features using a preset image-text feature matching unit constructed on the basis of a preset self-attention mechanism to obtain a first fused encoding feature;
    performing image-text error correction on the first fused encoding feature and the text encoding feature using a preset error correction unit to obtain a corrected fused feature and a corrected text encoding feature, the preset error correction unit being a unit constructed on the basis of the preset self-attention mechanism and a preset cross-attention mechanism;
    inputting the spliced encoding feature and the corrected text encoding feature into the preset image-text feature matching unit to obtain a second fused encoding feature; and
    correcting a preset frame feature through a preset target frame correction unit using a target encoding feature determined on the basis of the corrected fused feature and the second fused encoding feature, and predicting a regional position coordinate of a target visual object on the target image using a corrected frame feature, wherein the preset target frame correction unit is a unit constructed on the basis of the preset self-attention mechanism and the preset cross-attention mechanism.

2. The visual positioning method according to claim 1, wherein before the performing image-text feature matching on the spliced encoding features using a preset image-text feature matching unit constructed on the basis of a preset self-attention mechanism, the method further comprises:
    constructing an image-text feature matching sub-unit using a self-attention operation unit, a layer normalization unit, a feature deletion unit, and a feature addition unit which are constructed on the basis of the preset self-attention mechanism; and
    concatenating a first preset number of the image-text feature matching sub-units successively to construct and obtain the preset image-text feature matching unit;
    wherein the performing image-text feature matching on the spliced encoding features using a preset image-text feature matching unit constructed on the basis of a preset self-attention mechanism to obtain a first fused encoding feature comprises:
    taking the first image-text feature matching sub-unit in the preset image-text feature matching unit as a current image-text feature matching-sub-unit, and taking the spliced encoding feature as a feature to be processed;
    inputting the feature to be processed into the current image-text feature matching sub-unit;
    performing a self-attention operation, a layer normalization operation, a feature deletion operation, and a feature addition operation successively on the feature to be processed using the current image-text feature matching sub-unit to obtain a corresponding current operation processing result; and
    obtaining the first fused encoding feature according to the current operation processing result.

3. The visual positioning method according to claim 2, wherein the obtaining the first fused encoding feature according to the current operation processing result comprises:
    determining whether the current image-text feature matching sub-unit is the last one;
    in response to the current image-text feature matching sub-unit not being the last one, updating the current image-text feature matching sub-unit to a next image-text feature matching sub-unit, updating the feature to be processed to the current operation processing result, and returning to perform the inputting the feature to be processed into the current image-text feature matching sub-unit; and
    in response to the current image-text feature matching sub-unit being the last one, taking the current operation processing result as the first fused encoding feature.

4. The visual positioning method according to claim 2, wherein the performing a self-attention operation, a layer normalization operation, a feature deletion operation, and a feature addition operation successively on the feature to be processed using the current image-text feature matching sub-unit to obtain a corresponding current operation processing result comprises:
    performing the self-attention operation on the feature to be processed using the self-attention operation unit in the current image-text feature matching sub-unit to obtain a first operation feature;
    performing layer normalization on the first operation feature using the layer normalization unit in the current image-text feature matching sub-unit to obtain a second operation feature;
    performing the feature deletion operation on the second operation feature using the feature deletion unit in the current image-text feature matching sub-unit according to a preset proportion to obtain a third operation feature; and performing the feature addition operation on the third operation feature and the feature to be processed using the feature addition unit in the current image-text feature matching sub-unit to obtain the operation processing result in the current image-text feature matching sub-unit.

5. The visual positioning method according to claim 1, wherein before the performing image-text error correction on the first fused encoding feature and the text encoding feature using a preset error correction unit, the method further comprises:
constructing a first error correction sub-unit using a self-attention operation unit, a feature deletion unit, a layer normalization unit, and a feature addition unit which are constructed on the basis of the preset self-attention mechanism;
constructing a second error correction sub-unit using a cross-attention operation unit, a feature deletion unit, a layer normalization unit, and a feature addition unit which are constructed on the basis of the preset cross-attention mechanism; and
concatenating the first error correction sub-unit and a second preset number of the second error correction sub-units successively to construct and obtain the preset error correction unit.

6. The visual positioning method according to claim 5, wherein the performing image-text error correction on the first fused encoding feature and the text encoding feature using a preset error correction unit to obtain a corrected fused feature and a corrected text encoding feature comprises:
inputting the first fused encoding feature and the text encoding feature into the first error correction sub-unit in the preset error correction unit, so as to perform a self-attention operation, a feature deletion operation, a layer normalization operation, and a feature addition operation on both of the first fused encoding feature and the text encoding feature to obtain first operation processing results corresponding to each of the first fused encoding feature and the text encoding feature;
taking the first second error correction sub-unit in the preset error correction unit as a current second error correction sub-unit, and taking the first operation processing results corresponding to each of the first fused encoding feature and the text encoding feature as current features to be processed;
inputting the feature to be processed into the current second error correction sub-unit;
performing a cross-attention operation, the feature deletion operation, the layer normalization operation, and the feature addition operation successively on the feature to be processed using the current second error correction sub-unit to obtain current second operation processing results corresponding to each of the first fused encoding feature and the text encoding feature; and
obtaining the corrected text encoding feature according to the current second operation processing results.

7. The visual positioning method according to claim 6, wherein the obtaining the corrected text encoding feature according to the current second operation processing results comprises:
determining whether the current second error correction sub-unit is the last one;
in response to the current second error correction sub-unit not being the last one, updating the current second error correction sub-unit to a next second error correction sub-unit, updating the feature to be processed to the current second operation processing result, and returning to perform the step of inputting the feature to be processed into the current second error correction sub-unit; and
in response to the current second error correction sub-unit being the last one, taking the current second operation processing results corresponding to each of the first fused encoding feature and the text encoding feature as the corrected fused feature and the corrected text encoding feature, respectively.

8. The visual positioning method according to claim 1, wherein before the correcting a preset frame feature through a preset target frame correction unit using a target encoding feature determined on the basis of the corrected fused feature and the second fused encoding feature, the method further comprises:
constructing a first target frame correction sub-unit using a self-attention operation unit, a feature deletion unit, a layer normalization unit, and a feature addition unit which are constructed on the basis of the preset self-attention mechanism;
constructing a second target frame correction sub-unit using a cross-attention operation unit, a feature deletion unit, a layer normalization unit, and a feature addition unit which are constructed on the basis of the preset cross-attention mechanism; and
concatenating the first target frame correction sub-unit and a third preset number of the second target frame correction sub-units successively to construct and obtain the preset target frame correction unit.

9. The visual positioning method according to claim 8, wherein the correcting a preset frame feature through a preset target frame correction unit using a target encoding feature determined on the basis of the corrected fused feature and the second fused encoding feature comprises:
inputting the target encoding feature and the preset frame feature into the first target frame correction sub-unit in the preset target frame correction unit, so as to perform a self-attention operation, a feature deletion operation, a layer normalization operation, and a feature addition operation on both of the target encoding feature and the preset frame feature to obtain third operation processing results corresponding to each of the target encoding feature and the preset frame feature;
taking the first second target frame correction sub-unit in the preset target frame correction unit as a current second target frame correction sub-unit, and taking the third operation processing results corresponding to each of the target encoding feature and the preset frame feature as current features to be processed;
inputting the feature to be processed into the current second target frame correction sub-unit;
performing a cross-attention operation, the feature deletion operation, the layer normalization operation, and the feature addition operation successively on the feature to be processed using the current second target frame correction sub-unit to obtain current fourth operation processing results corresponding to each of the target encoding feature and the preset frame feature; and
obtaining the corrected frame feature according to the current fourth operation processing results.

10. The visual positioning method according to claim 9, wherein the obtaining the corrected frame feature according to the current fourth operation processing results comprises:

determining whether the current second target frame correction sub-unit is the last one;

in response to the current second target frame correction sub-unit not being the last one, updating the current second target frame correction sub-unit to a next second target frame correction sub-unit, updating the feature to be processed to the current fourth operation processing result, and returning to perform the step of inputting the feature to be processed into the current second target frame correction sub-unit; and in response to the current second target frame correction sub-unit being the last one, taking the current fourth operation processing result as the corrected frame feature.

11. The visual positioning method according to claim 1, wherein before the correcting a preset frame feature using a target encoding feature determined on the basis of the corrected fused feature and the second fused encoding feature, the method further comprises:

determining a feature obtained by performing a preset operation on the corrected fused feature or the second fused encoding feature or performing the preset operation on the corrected fused feature and the second fused encoding feature as the target encoding feature, wherein the preset operation comprises performing feature addition or feature splicing on the corrected fused feature and the second fused encoding feature.

12. The visual positioning method according to claim 11, wherein a formula for the feature addition is:

$$f_{cat} = f_{modify} + f_{denoise},$$

wherein $f_{modify}$ is the corrected fused feature, $f_{denoise}$ is a denoised fused feature, and $f_{eat}$ is an output after the feature addition.

13. The visual positioning method according to claim 11, wherein a formula for the feature splicing is:

$$f_{cat} = [f_{modify}; f_{denoise}],$$

wherein $f_{modify}$ is the corrected fused feature, $f_{denoise}$ is a denoised fused feature, and $f_{eat}$ is an output after the feature splicing.

14. The visual positioning method according to claim 1 wherein the predicting a regional position coordinate of a target visual object on the target image using a corrected frame feature comprises:

inputting the corrected frame feature into a coordinate predictor constructed on the basis of a first fully connected layer and a second fully connected layer, wherein the first fully connected layer is a fully connected layer for predicting confidence levels of initial target frames, and the second fully connected layer is a fully connected layer for performing coordinate regression on the initial target frames;

determining a confidence level of each initial target frame using the coordinate predictor and the corrected frame feature; and determining the regional position coordinate of the target visual object on the target image according to the confidence level of each initial target frame and a coordinate of each initial target frame.

15. The visual positioning method according to claim 14, wherein the determining the regional position coordinate of the target visual object on the target image according to the confidence level of each initial target frame and a coordinate of each initial target frame comprises:

sorting the confidence levels in a descending order, then screening the initial target frame with a highest confidence level from a descending order sorting result, and determining the coordinate of the screened initial target frame as the regional position coordinate of the target visual object on the target image.

16. The visual positioning method according to claim 1, wherein the method further comprises:

creating the preset self-attention mechanisms on the basis of a first preset formula, wherein the first preset formula is:

$$attn_{self}(f) = \text{softmax}\left(\frac{(W_q \cdot f)^T \times (W_k \cdot f)}{\sqrt{\text{size}(f)}}\right) \times (W_v \cdot f),$$

wherein f is an input of each preset self-attention mechanism, $W_q$, $W_k$, and $W_v$ represent a mapping matrix, size(f) represents a dimension, $attn_{self}(f)$ represents an output of the preset self-attention mechanism, and softmax represents an activation function.

17. The visual positioning method according to claim 1, wherein the method further comprises:

creating the preset cross-attention mechanism on the basis of a second preset formula, wherein the second preset formula is:

$$attn_{cross}(f, g) = \text{softmax}\left(\frac{(W_q \cdot f)^T \times (W_k \cdot g)}{\sqrt{\text{size}(g)}}\right) \times (W_v \cdot g),$$

wherein f and g represent two input features participating in a cross-attention operation each time in a cross-attention layer in the preset cross-attention mechanism, size (g) represents a dimension, $attn_{cross}(f, g)$ represents an output of the preset cross-attention mechanism, and softmax represents an activation function.

18. The visual positioning method according to claim 1, wherein the encoding a target image and a target text comprises:

encoding the target image using a convolutional neural network (CNN) residual neural network; and encoding the target text using a Roberta model or a Berts model.

19. An electronic device, comprising:

a memory storing computer readable instructions; and one or more processors configured to execute the computer readable instructions, wherein upon execution by the one or more processors, the one or more processors is configured to:

encode a target image and a target text, and perform feature splicing on an image encoding feature and a text encoding feature obtained after the encoding to obtain spliced encoding features;

perform image-text feature matching on the spliced encoding features using a preset image-text feature matching unit constructed on the basis of a preset self-attention mechanism to obtain a first fused encoding feature;

perform image-text error correction on the first fused encoding feature and the text encoding feature using a preset error correction unit to obtain a corrected fused feature and a corrected text encoding feature, the preset error correction unit being a unit constructed on the basis of the preset self-attention mechanism and a preset cross-attention mechanism;

input the spliced encoding feature and the corrected text encoding feature into the preset image-text feature matching unit to obtain a second fused encoding feature; and correct a preset frame feature through a preset target frame correction unit using a target encoding feature determined on the basis of the corrected fused feature and the second fused encoding feature, and predict a regional position coordinate of a target visual object on the target image using a corrected frame feature, wherein the preset target frame correction unit is a unit constructed on the basis of the preset self-attention mechanism and the preset cross-attention mechanism.

20. One or more non-volatile computer readable storage media storing computer readable instructions executable by one or more processors, wherein the computer readable instructions, upon execution by the one or more processors, are figured to cause the one or more processors to:

encode a target image and a target text, and perform feature splicing on an image encoding feature and a text encoding feature obtained after the encoding to obtain spliced encoding features;

perform image-text feature matching on the spliced encoding features using a preset image-text feature matching unit constructed on the basis of a preset self-attention mechanism to obtain a first fused encoding feature;

perform image-text error correction on the first fused encoding feature and the text encoding feature using a preset error correction unit to obtain a corrected fused feature and a corrected text encoding feature, the preset error correction unit being a unit constructed on the basis of the preset self-attention mechanism and a preset cross-attention mechanism;

input the spliced encoding feature and the corrected text encoding feature into the preset image-text feature matching unit to obtain a second fused encoding feature; and correct a preset frame feature through a preset target frame correction unit using a target encoding feature determined on the basis of the corrected fused feature and the second fused encoding feature, and predict a regional position coordinate of a target visual object on the target image using a corrected frame feature, wherein the preset target frame correction unit is a unit constructed on the basis of the preset self-attention mechanism and the preset cross-attention mechanism.

\* \* \* \* \*